US012334024B2

(12) United States Patent
Imai et al.

(10) Patent No.: US 12,334,024 B2
(45) Date of Patent: Jun. 17, 2025

(54) DISPLAYS WITH MESOPIC VISION COMPENSATION

(71) Applicant: Apple Inc., Cupertino, CA (US)

(72) Inventors: Francisco H Imai, San Jose, CA (US); Osborn F de Lima, Santa Clara, CA (US); Jun Miao, San Jose, CA (US); Pradeep Nagesh, Irvine, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/169,685

(22) Filed: Feb. 15, 2023

(65) Prior Publication Data

US 2023/0317020 A1 Oct. 5, 2023

Related U.S. Application Data

(60) Provisional application No. 63/326,167, filed on Mar. 31, 2022.

(51) Int. Cl.
*G09G 3/20* (2006.01)
*G09G 3/34* (2006.01)

(52) U.S. Cl.
CPC ... *G09G 3/3406* (2013.01); *G09G 2320/0646* (2013.01); *G09G 2360/144* (2013.01)

(58) Field of Classification Search
CPC ..... G09G 2360/144; G09G 2320/0666; G09G 2320/0646; G09G 2320/066; G09G 3/3406; G09G 3/3208; G09G 3/2003; G09G 3/2007
See application file for complete search history.

(56) References Cited

U.S. PATENT DOCUMENTS

| | | | | |
|---|---|---|---|---|
| 8,941,678 | B2 | 1/2015 | Kurtz et al. | |
| 9,105,217 | B2 | 8/2015 | Demos | |
| 9,773,473 | B2 | 9/2017 | Gallo et al. | |
| 10,607,525 | B2 | 3/2020 | Akhavan et al. | |
| 10,846,832 | B2 | 11/2020 | Mantiuk et al. | |
| 2018/0130393 | A1* | 5/2018 | Akhavan | G09G 3/3208 |
| 2020/0082791 | A1* | 3/2020 | Petrie | G09G 3/20 |
| 2022/0101502 | A1 | 3/2022 | Pouli et al. | |
| 2023/0075171 | A1* | 3/2023 | Grolman | H01L 25/167 |

* cited by examiner

*Primary Examiner* — Dennis P Joseph
(74) *Attorney, Agent, or Firm* — Treyz Law Group, P.C.; Kendall P. Woodruff

(57) ABSTRACT

An electronic device may include a display, an ambient light sensor, and control circuitry. The control circuitry may use a mesopic vision model to compensate images that are displayed in low light conditions when the measured ambient light brightness is below a threshold. The mesopic vision model may use a tone mapping process and a color mapping process to compensate for the reduced color sensitivity of the retina in low light conditions. The control circuitry may iteratively adjust weights associated with the tone mapping process and the color mapping process until a perceived (retinal) version of the compensated image in the measured ambient light conditions closely matches a perceived (retinal) version of the original image in reference ambient light conditions. The control circuitry may use a joint optimization process that balances the contrast and color of the compensated image.

20 Claims, 8 Drawing Sheets

DISPLAYS WITH MESOPIC VISION COMPENSATION

This application claims the benefit of provisional patent application No. 63/326,167, filed Mar. 31, 2022, which is hereby incorporated by reference herein in its entirety.

FIELD

This relates generally to electronic devices, and, more particularly, to electronic devices with displays.

BACKGROUND

Electronic devices such as laptop computers, cellular telephones, and other equipment are sometimes provided with displays and light sensors. For example, ambient light sensors may be incorporated into a device to provide the device with information on current lighting conditions. Ambient light readings may be used in controlling the device. If, for example bright daylight conditions are detected, an electronic device may increase display brightness to compensate. Similarly, display brightness may be decreased in low light conditions to avoid eye strain.

Conventional methods of dimming a display in low light may reduce the perceived quality of colors in images due to reduced sensitivity of cones in the retina.

SUMMARY

An electronic device may include a display, an ambient light sensor, and control circuitry. The ambient light sensor may be configured to measure the color and brightness (e.g., illuminance) of ambient light. The control circuitry may adjust the brightness, color, and/or contrast of the display based on the brightness and/or color of ambient light.

The control circuitry may use a mesopic vision model to compensate images that are displayed in low light conditions when the measured ambient light brightness is below a threshold. The mesopic vision model may use a tone mapping process and a color mapping process to compensate for the reduced color sensitivity of the retina in low light conditions. The control circuitry may iteratively adjust weights associated with the tone mapping process and the color mapping process until a perceived (retinal) version of the compensated image in the measured ambient light conditions closely matches a perceived (retinal) version of the original image in reference ambient light conditions. The control circuitry may use a joint optimization process that balances the contrast and color of the compensated image.

DETAILED DESCRIPTION

Figure 1:
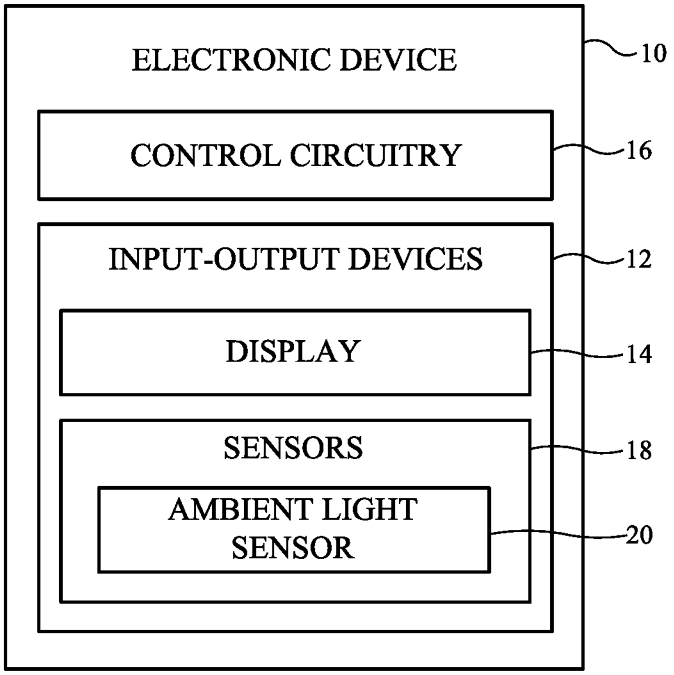
FIG. 1 is a schematic diagram of an illustrative electronic device with an ambient light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, keypads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be insensitive to touch or may be a touch screen display that includes a touch sensor for gathering touch input from a user. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include one or more ambient light sensors such as ambient light sensor 20 and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors).

Ambient light sensor 20 for device 10 may be a color ambient light sensor having an array of detectors each of which is provided with a color filter. If desired, the detectors in ambient light sensor 20 may be provided with color filters of different respective colors. Information from the detectors may be used to measure the total amount of ambient light that is present in the vicinity of device 10. For example, the ambient light sensor may be used to determine whether device 10 is in a dark or bright environment. Based on this information, control circuitry 16 can adjust display brightness and/or color for display 14 or can take other suitable action. This is, however, merely illustrative. If desired, ambient light sensor 20 may be insensitive to color and may be configured to measure ambient light brightness only. Arrangements in which ambient light sensor 20 is a color ambient light sensor that measures both brightness and color of ambient light are sometimes described herein as an illustrative example.

Ambient light sensors 20 may be used to make ambient light intensity (e.g., brightness, illuminance, and/or luminance flux per unit area) measurements. Ambient light intensity measurements, which may sometimes be referred to as ambient light illuminance measurements, may be used by device 10 to adjust display brightness, contrast, color, and/or other characteristics of the display. Ambient light sensors 20 may also, if desired, be used to make measurements of ambient light color (e.g., color coordinates, correlated color temperature, or other color parameters representing ambient light color). Control circuitry 16 may convert these different types of color information to other formats, if desired (e.g., a set of red, green, and blue sensor output values may be converted into color chromaticity coordinates and/or may be processed to produce an associated correlated color temperature, etc.).

Color information and illuminance information from ambient light sensor 20 can be used to adjust the operation of device 10. For example, the color cast of display 14 (e.g., the white point of display 14) may be adjusted in accordance with the color of ambient lighting conditions. If, for example, a user moves device 10 from a cool lighting environment (e.g., an outdoor blue sky environment) to a warm lighting environment (e.g., an incandescent light environment), the warmth of display 14 may be increased accordingly, so that the user of device 10 does not perceive display 14 as being overly cold. If desired, the ambient light sensor may include an infrared light sensor. In general, any suitable actions may be taken based on color measurements and/or total light intensity measurements (e.g., adjusting display brightness, adjusting display content, changing audio and/or video settings, adjusting sensor measurements from other sensors, adjusting which on-screen options are presented to a user of device 10, adjusting wireless circuitry settings, etc.).

Figure 2:
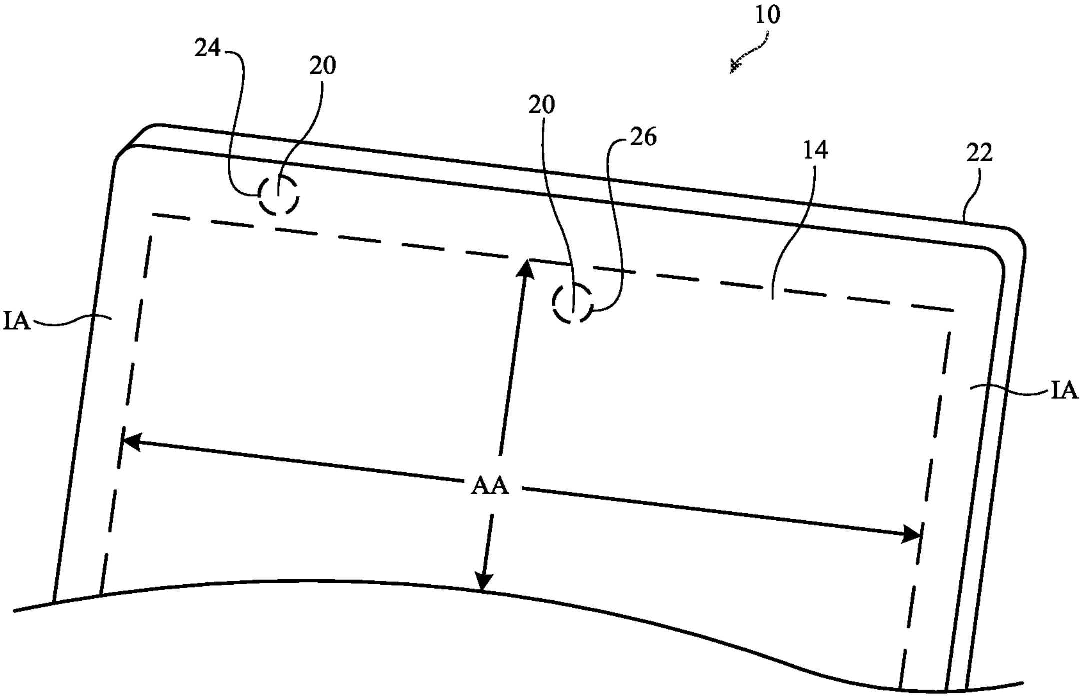
FIG. 2 is a front perspective view of a portion of an illustrative electronic device with an ambient light sensor in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of IA to accommodate the optical components. For example, a light component window such as an ambient light sensor window may be formed in a peripheral portion of display 14 such as region 24 in inactive border area IA. Ambient light from the exterior of device 10 may be measured by ambient light sensor 20 in device 10 after passing through region 24 and the display cover layer.

If desired, optical components such as ambient light sensor 20 may instead or additionally be mounted in active area AA of display 14. For example, as shown in FIG. 2, ambient light sensor 20 may be mounted in region 26 of active area AA. Ambient light sensor 20 may be mounted within the array of pixels of display 14 or may be mounted behind the array of pixels of display 14. With this type of arrangement, ambient light sensor 20 may sense ambient light that passes through the active area AA of display 14.

Figure 3:
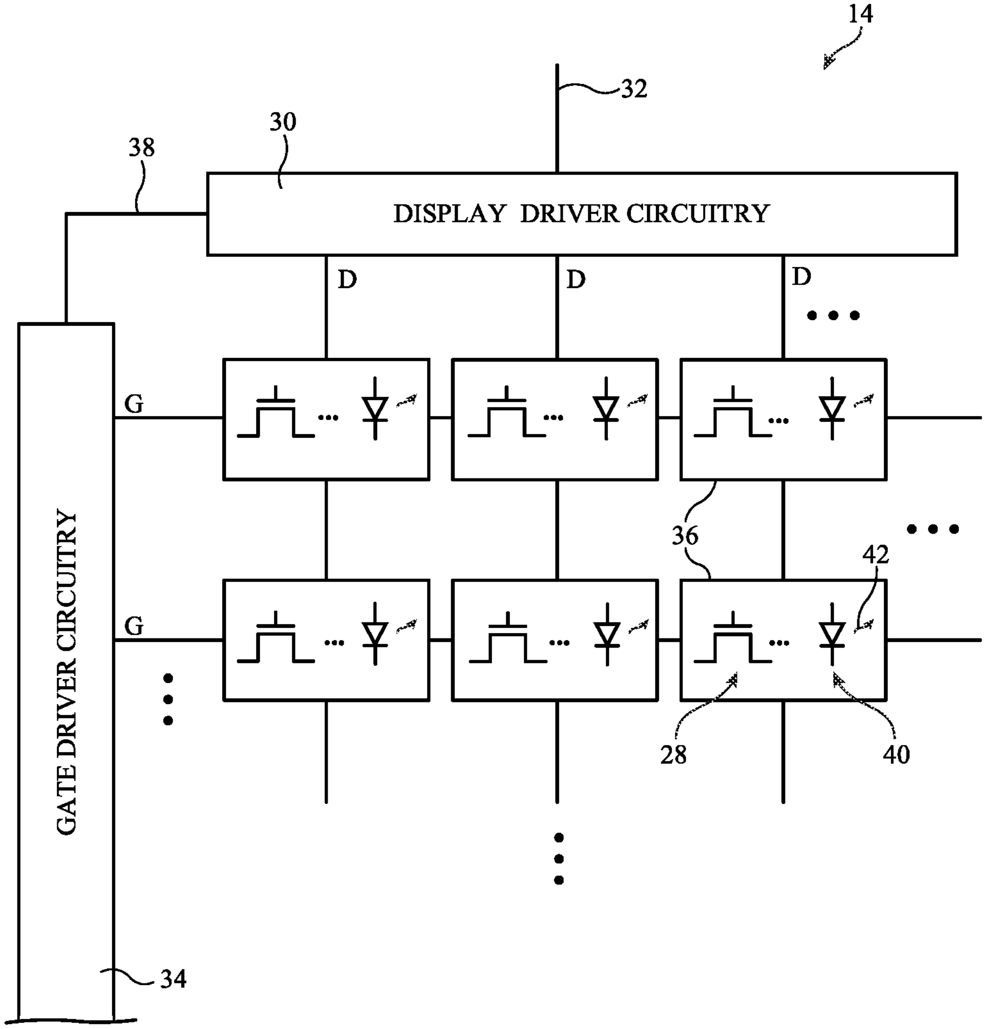
FIG. 3 is a schematic diagram of an illustrative display with light-emitting elements in accordance with an embodiment.

A top view of a portion of display 14 is shown in FIG. 3. As shown in FIG. 3, display 14 may have an array of pixels 36 formed on a substrate. Pixels 36 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 36 in display 14 (e.g., tens or more, hundreds or more, or thousands or more). Each pixel 36 may include a light-emitting diode 40 that emits light 42 under the control of a pixel control circuit formed from thin-film transistor circuitry such as thin-film transistors 28 and thin-film capacitors. Thin-film transistors 28 may be polysilicon thin-film transistors, semiconducting-oxide thin-film transistors such as indium zinc gallium oxide (IGZO) transistors, or thin-film transistors formed from other semiconductors. Pixels 36 may contain light-emitting diodes of different colors (e.g., red, green, and blue) to provide display 14 with the ability to display color images or may be monochromatic pixels.

Display driver circuitry may be used to control the operation of pixels 36. The display driver circuitry may be formed from integrated circuits, thin-film transistor circuits, or other suitable circuitry. Display driver circuitry 30 of FIG. 3 may contain communications circuitry for communicating with system control circuitry such as control circuitry 16 of FIG. 1 over path 32. Path 32 may be formed from traces on a flexible printed circuit or other cable. During operation, control circuitry 16 may supply display driver circuitry 30 with information on images to be displayed on display 14.

To display the images on display pixels 36, display driver circuitry 30 may supply image data to data lines D while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14.

Gate driver circuitry 34 (sometimes referred to as row control circuitry) may be implemented as part of an integrated circuit and/or may be implemented using thin-film transistor circuitry. Horizontal control lines G in display 14 may carry gate line signals such as scan line signals, emission enable control signals, and other horizontal control signals for controlling the display pixels 36 of each row. There may be any suitable number of horizontal control signals per row of pixels 36 (e.g., one or more row control signals, two or more row control signals, three or more row control signals, four or more row control signals, etc.).

The region on display 14 where the display pixels 36 are formed may sometimes be referred to herein as the active area. Electronic device 10 has an external housing with a peripheral edge. The region surrounding the active area and within the peripheral edge of device 10 is the border region. It is generally desirable to minimize the border region of device 10. For example, device 10 may be provided with a full-face display 14 that extends across the entire front face of the device. If desired, display 14 may also wrap around over the edge of the front face so that at least part of the lateral edges or at least part of the back surface of device 10 is used for display purposes.

Control circuitry 16 may gather ambient light sensor data from ambient light sensor 20 to adaptively determine how to adjust display light and display colors based on ambient lighting conditions. If desired, control circuitry 16 may control display 14 using other information such as time information from a clock, calendar, and/or other time source, location information from location detection circuitry (e.g., Global Positioning System receiver circuitry, IEEE 802.11 transceiver circuitry, or other location detection circuitry), user input information from a user input device such as a touchscreen (e.g., touchscreen display 14) or keyboard, etc.

Ambient light sensor 20 may be used to measure the color and/or intensity of ambient light. Control circuitry 16 may adjust the operation of display 14 based on the color and/or intensity of ambient light. In adjusting the output from display 14, control circuitry 16 may take into account the chromatic adaptation function of the human visual system. This may include, for example, adjusting the white point of display 14 based on the color and/or brightness of ambient light measured by ambient light sensor 20. If, for example, a user moves device 10 from a cool lighting environment (e.g., outdoor light having a relatively high correlated color temperature) to a warm lighting environment (e.g., indoor light having a relatively low correlated color temperature), the "warmth" of display 14 may be increased accordingly by adjusting the white point of display 14 to a warmer white (e.g., a white with a lower color temperature), so that the user of device 10 does not perceive display 14 as being overly cold.

Control circuitry 16 may also adjust the brightness of display 14 based on ambient light conditions. When ambient light sensor 20 detects bright light (e.g., outdoors, in an office, etc.), control circuitry 16 may increase the brightness of display 14. When ambient light sensor 20 detects dim ambient light (e.g., in a bedroom, at night, etc.), control circuitry 16 may decrease the brightness of display 14. Care must be taken, however, to account for the changes that occur in the human visual system under different lighting conditions. The retina operates using two photoreceptor systems: rods and cones. In bright light, a user's photopic vision is activated and the retina primarily uses the three cones (L, S, and M cones) to see color, while the rods remain mostly saturated. Under moderately dim ambient light conditions, a user's mesopic vision is activated, with both rods and cones being used to see color, but with lower perceived quality. In very dim light, scotopic vision is activated and only rods are active.

As rods become more active in low light conditions, colors may appear washed out. As a result, merely dimming a display in low light conditions without accounting for the reduced color sensitivity of the cones in the retina will cause displayed images to appear washed out. To account for the reduced color sensitivity in mesopic lighting conditions (e.g., dim ambient light conditions), control circuitry 16 may use a mesopic vision model to compensate images for colorfulness as well as brightness and contrast, since these three properties are interdependent.

Figure 4:
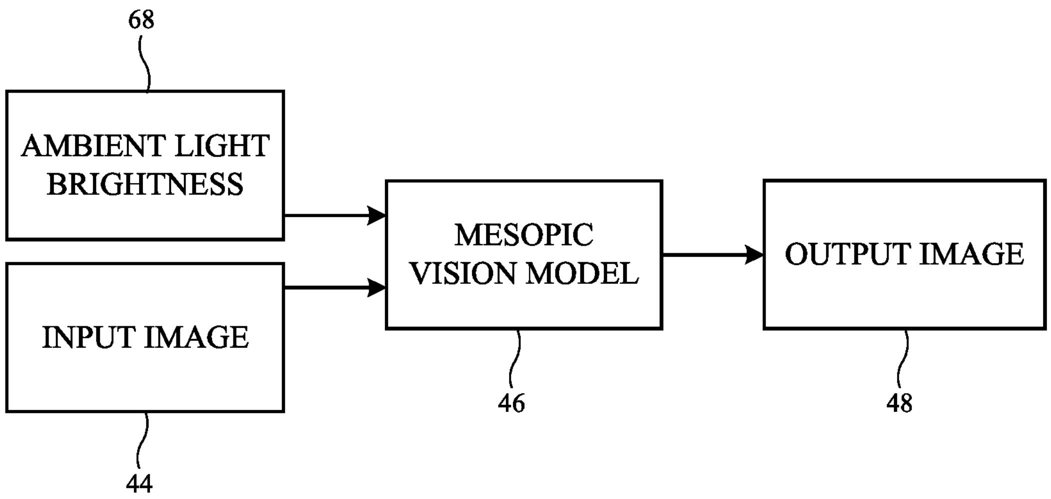
FIG. 4 is a diagram of an illustrative technique for displaying compensated images in low light using a mesopic vision model in accordance with an embodiment.

FIG. 4 is a diagram showing how a mesopic vision model may be used to generate compensated images for display 14. As shown in FIG. 4, control circuitry 16 may use a mesopic vision model such as mesopic vision model 46. Mesopic vision model 46 in control circuitry 16 may receive input information such as ambient light brightness 68 and input image 44. Ambient light brightness 68 may be measured by ambient light sensor 20 during operation of device 10. Input image 44 may be a color image to be displayed on display 14. When ambient light brightness 68 is below a given threshold (e.g., a threshold past which mesopic vision and rods become active while photopic vision and cones become less active), control circuitry 16 may use mesopic vision model 46 to compensate input image 44 and provide the compensated image as output image 48. This may include, for example, applying a tone mapping curve to the input image to map input grey levels to output grey levels and applying a color mapping to map input colors to output colors. The tone mapping and color mapping may boost the contrast and colorfulness of image 48 in low light conditions without requiring the user to simply increase the brightness of display 14 (which could cause eye strain in low light conditions). Compensated output image 48 may be displayed on display 14.

By compensating images in low light conditions for the reduced color sensitivity of the human visual system, images on display 14 such as compensated output image 48 may exhibit consistent vivid color even when display 14 is operating at a lower brightness level. In addition to maintaining vivid colors in low light, using mesopic vision model 46 to compensate images in low light may result in higher contrast for better readability, sufficient brightness for eye comfort without excessive power consumption, power savings with reduced headroom for displaying high dynamic range image content, and better high dynamic range experience in low light with better image quality and highlights.

Mesopic vision model 46 may include a photopic vision component and a scotopic vision component. The weights applied to each of the photopic vision component and the scotopic vision component may change depending on the brightness of the ambient light, with a greater weight generally being applied to the photopic component than the scotopic component when ambient light is brighter, and a greater weight generally being applied to the scotopic component than the photopic component when ambient light is dimmer. Mesopic vision model 46 may be based on a two-stage model including the cone and opponent stages and may assume rod intrusion at the opponent stage. Model 46 may include a gradual and/or nonlinear shift in spectral luminous efficiency to account for the spectral sensitivity difference between photopic and scotopic vision and the nonlinearity of rod influence on the luminance channel. Model 46 may assume a decrease in the chromatic component with decreasing illuminance to account for the reduction of saturation at low illuminance levels. Model 46 may also assume that the red-green component and yellow-blue component change with illuminance levels independently of one another, which will help account for hue shifts that occur with decreasing illuminance.

Figure 5:
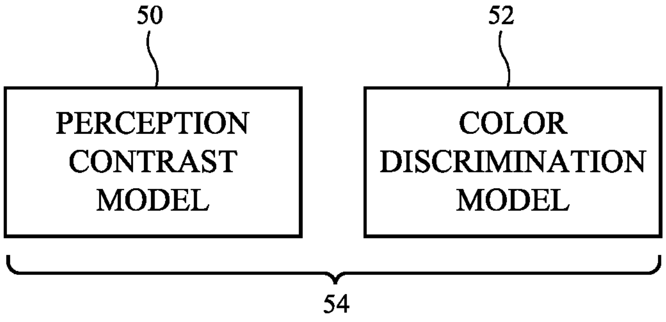
FIG. 5 is a diagram of illustrative models that may be used to quantitatively evaluate image quality of compensated images that are compensated using a mesopic vision model in accordance with an embodiment.

Control circuitry 16 may use one or more additional models to assign an image quality score to images that are compensated using mesopic vision model 46. For example, as shown in FIG. 5, control circuitry 16 may use one or more image quality models 54 to assign image quality scores to compensated images such as image 48. Image quality models 54 may include perception contrast model 50 and color discrimination model 52. One or both of perception contrast model 50 and color discrimination model 52 may be based on user studies. For example, a user study may be conducted to measure the tolerance of color shift in low light conditions (e.g., by asking a user to select a color patch that is identical to another color patch, etc.). The output from the study may be used to calculate a just noticeable difference (JND) metric based on a psychophysical distribution function. Color discrimination model 52 may be configured to calculate the color deviation (e.g., in JND or other suitable unit) for multiple different colors in different display brightness and ambient light conditions based on the user study. Similarly, perception contrast model 50 may be based on one or more user studies such as a dichotic viewing study. The user may adjust the tone curve for an image on a dim side of a display in order to match its apparent contrast to a reference image on a bright side of a display. Perception contrast model 50 may be based on a luminance contrast sensitivity function, if desired. These examples are merely illustrative. If desired, image quality models 54 may be based on other types of user studies and/or based on other data.

Models 54 may be used to assess whether mesopic vision model 46 has applied the appropriate tone mapping and color mapping to input image 44. For example, contrast model 50 may be used to produce a contrast quality score indicating how close the contrast of the perceived compensated image 48 in the measured (dim) ambient light conditions is to that of the perceived original image in normal (bright) ambient light conditions. Color discrimination model 52 may be used to produce a color quality score indicating how close the colors (e.g., colorfulness) of the perceived compensated image 48 in the measured ambient light conditions are to that of the perceived original image in normal ambient light conditions. The lower the image quality scores output by models 54, the closer the compensated image 48 in low light is likely to be to the original image in normal ambient light. If the score is too high (e.g., above some threshold, indicating that compensated image 48 in low light conditions is too noticeably different from the original input image 44 in well-lit conditions), control circuitry 16 may adjust the tone mapping and/or the color mapping applied by mesopic vision model 46 until model 54 produces a sufficiently low score. In other words, mesopic vision model 46 may be configured to iteratively adjust the compensation applied to images in low light to minimize a function that jointly optimizes both contrast and colorfulness in compensated image 48.

Figure 6:
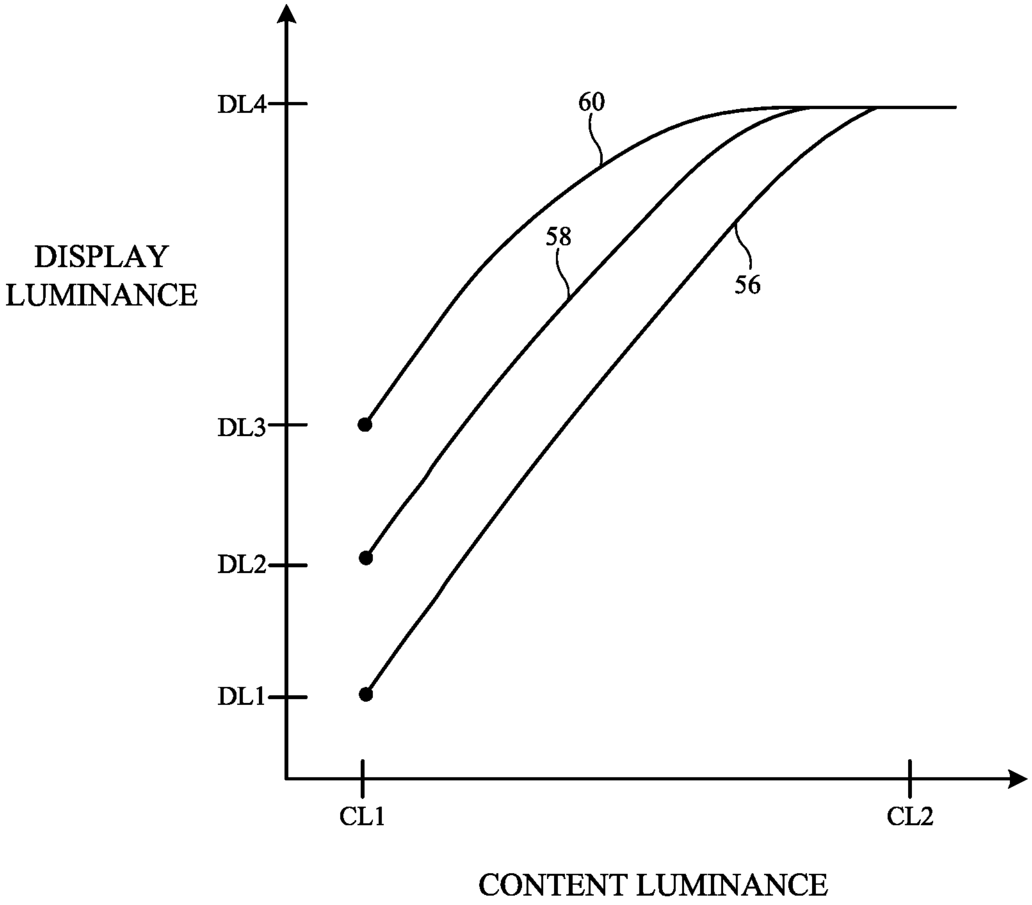
FIG. 6 is a graph of illustrative tone mapping curves that may be used to compensate for reduced contrast in low light in accordance with an embodiment.

FIG. 6 is a graph showing an illustrative set of tone mapping curves that may be used by mesopic vision model 46 to compensate display images in low light conditions. A tone mapping curve may be used to map content luminance values to display luminance values (sometimes referred to as gray levels). In the example of FIG. 6, three illustrative content-luminance-to-display-luminance mapping curves 56, 58, and 60 are shown. The content luminance and display luminance axes of the graph of FIG. 6 have logarithmic scales. In the FIG. 6 example, curves 56, 58, and 60 represent tone mapping curves for display 14 that are associated with different weights. When mesopic vision model 46 is mapping input images to compensated output images, control circuitry 16 may apply a first tone mapping such as tone mapping curve 56 associated with a first weight to input image 44. The first weight may be an initial guess and/or may be based on the current ambient light brightness measured using ambient light sensor 20. After control circuitry 16 applies the first tone mapping curve 56 to input image 44, contrast model 50 may be used to assess the difference between the contrast of the compensated image 48 under low light with the contrast of the original image 48 under normal ambient light conditions. If the difference is too high (e.g., above some threshold), control circuitry 16 may apply a second tone mapping such as tone mapping curve 58 associated with a second weight to input image 44. The second weight may be based on the results of the first tone mapping and/or may be a best second guess. If contrast model 50 determines that the contrast of compensated image 48 is still too noticeably different from the original image under normal ambient light, control circuitry 16 may apply a third tone mapping such as tone mapping curve 60 associated with a third weight to input image 44. The third weight may be based on the results of the first and/or second tone mapping and/or may be a best third guess. This iterative process may repeat until perception contrast model 50 outputs an acceptable score for the compensated image 48. The use of curves 56, 58, and 60 are merely illustrative. If desired, control circuitry 16 may use other tone mapping curves, may use more or less than three tone mapping curves, and/or may cycle through tone curves in a different order.

In each of these curves, low content luminance values are associated with black and low grey levels and high content luminance values are associated with white and high gray levels. Curve 56 is associated with a display pixel luminance value of DL1 visible to the user for a content luminance value of CL1, curve 58 is associated with a display pixel luminance value of DL2 for content luminance CL1, and curve 60 is associated with a display pixel luminance value DL3 for content luminance CL1. The luminance level DL2 is brighter than luminance level DL1, because curve 58 is associated with a brighter set of output luminance values from pixels 36 than curve 56. Similarly, luminance level DL3 is brighter than luminance level DL2 because curve 60 is associated with a brighter set of output luminance values from pixels 36 than curve 58. White image pixels (e.g., pixels at content luminance level CL2) are all associated with the same display luminance level DL4 (e.g., the brightest output available from pixels 36 in display 14), so the mappings of curves 56, 58, and 60 will all produce a display luminance of DL4 for a content luminance of CL2.

Due to the interaction between colorfulness, contrast, and brightness, control circuitry 16 may use a joint optimization process that tunes the strengths (e.g., weights) of color compensation and contrast enhancement in order to balance the benefits of color, contrast, and brightness in low light conditions. In other words, the iterative tone mapping process described in connection with FIG. 6 may be applied alongside an iterative color mapping process, so that the overall image quality score (e.g., a sum of a contrast quality score associated with perceived contrast of the compensated image and a color quality score associated with a perceived color of the compensated image) takes into account the interdependency between color, contrast, and brightness.

Figure 7:
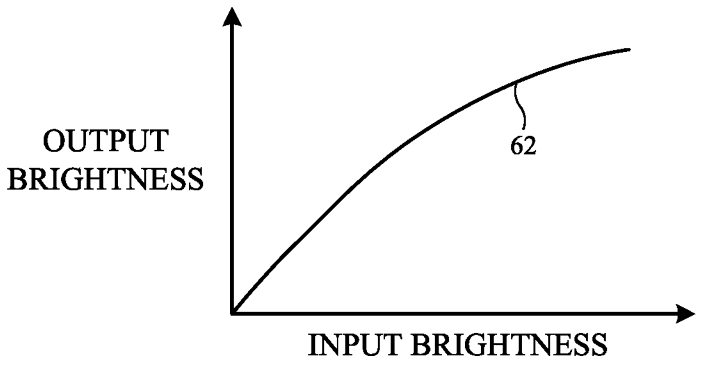
FIG. 7 is a graph of an illustrative brightness mapping curve for mapping display brightness values in an opponent color space in accordance with an embodiment.
Figure 8:
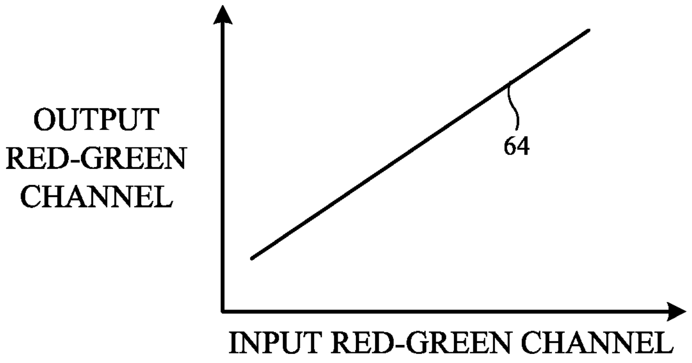
FIG. 8 is a graph of an illustrative color mapping curve for mapping red-green channel values in an opponent color space in accordance with an embodiment.
Figure 9:
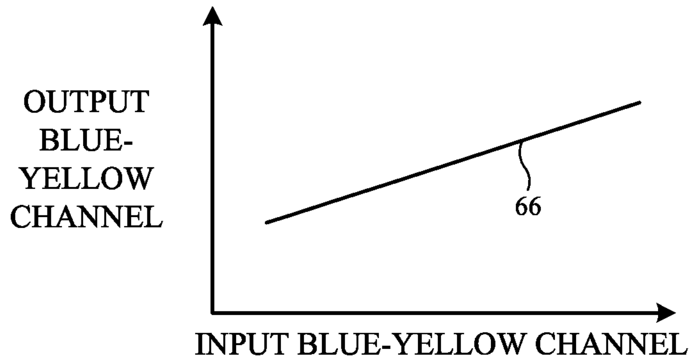
FIG. 9 is a graph of an illustrative color mapping curve for mapping blue-yellow channel values in an opponent color space in accordance with an embodiment.

Illustrative mapping functions that may be applied in low light conditions to compensate for the reduced color sensitivity of the human eye are shown in FIGS. 7, 8, and 9. The three mapping functions of FIGS. 7, 8, and 9 may be applied to input image 44 by mesopic vision model 46 so that the perceived appearance of final compensated output image 48 on display 14 in low light conditions closely matches what the perceived appearance of original image 44 would be in normal (e.g., well-lit) ambient viewing conditions. The use of only three mapping functions in mesopic vision model 46 is merely illustrative. If desired, there may be fewer than three or more than three (e.g., four, five, six, nine, ten, more than ten, less than ten) mapping functions in mesopic vision model 46. Arrangements in which model 46 uses a first mapping function for perceived brightness (FIG. 7), a second mapping function for the red-green channel (FIG. 8) and a third mapping function for the blue-yellow channel (FIG. 9) are sometimes described herein as an illustrative example.

To account for the behavior of the cones and rods in the human eye, the mapping functions used by control circuitry 16 (e.g., the mapping functions of FIGS. 7, 8, and 9) may take place in an opponent color space. Opponent color spaces may, for example, include L*a*b* color space (e.g., with L* representing lightness of a color, a* representing the red-green channel, and b* representing the blue-yellow channel), and/or any other suitable opponent color space. If desired, RGB values associated with an image such as input image 44 may be converted to the opponent color space directly and/or by first converting the RGB values to XYZ tristimulus values, converting the XYZ tristimulus values to an intermediate color space such as LMS color space, and converting the LMS values to the opponent color space (e.g., L*a*b* values). These types of conversions may be achieved using appropriate matrix transformation techniques.

FIG. 7 is a graph of an illustrative brightness mapping function such as brightness mapping function 62. Brightness mapping function 62 may be an exponential function (as illustrated in the example of FIG. 7), may be a linear function, or may be any other suitable function. Brightness mapping function 62 may be configured to map input brightness values (e.g., associated with input image 44) in an opponent color space to output brightness values (e.g., associated with compensated image 48) in the opponent color space. If desired, mapping function 62 may be associated with one or more weights that can be adjusted to fine-tune the compensation applied to input image 44 until the image quality score output by perception contrast model 50 and color discrimination model 52 is sufficient.

FIG. 8 is a graph of an illustrative color mapping function such as red-green channel mapping function 64. Red-green channel mapping function 64 may be a linear function (as illustrated in the example of FIG. 8), may be an exponential function, or may be any other suitable function. Red-green channel mapping function 64 may be configured to map input red-green values (e.g., associated with input image 44) in an opponent color space to output red-green values (e.g., associated with compensated image 48) in the opponent color space. If desired, mapping function 64 may be associated with one or more weights that can be adjusted to fine-tune the compensation applied to input image 44 until the image quality score output by perception contrast model 50 and color discrimination model 52 is sufficient.

FIG. 9 is a graph of an illustrative color mapping function such as blue-yellow channel mapping function 66. Blue-yellow channel mapping function 66 may be a linear function (as illustrated in the example of FIG. 9), may be an exponential function, or may be any other suitable function. Blue-yellow channel mapping function 66 may be configured to map input blue-yellow values (e.g., associated with input image 44) in an opponent color space to output blue-yellow values (e.g., associated with compensated image 48) in the opponent color space. If desired, mapping function 66 may be associated with one or more weights that can be adjusted to fine-tune the compensation applied to input image 44 until the image quality score output by perception contrast model 50 and color discrimination model 52 is sufficient.

Figure 10:
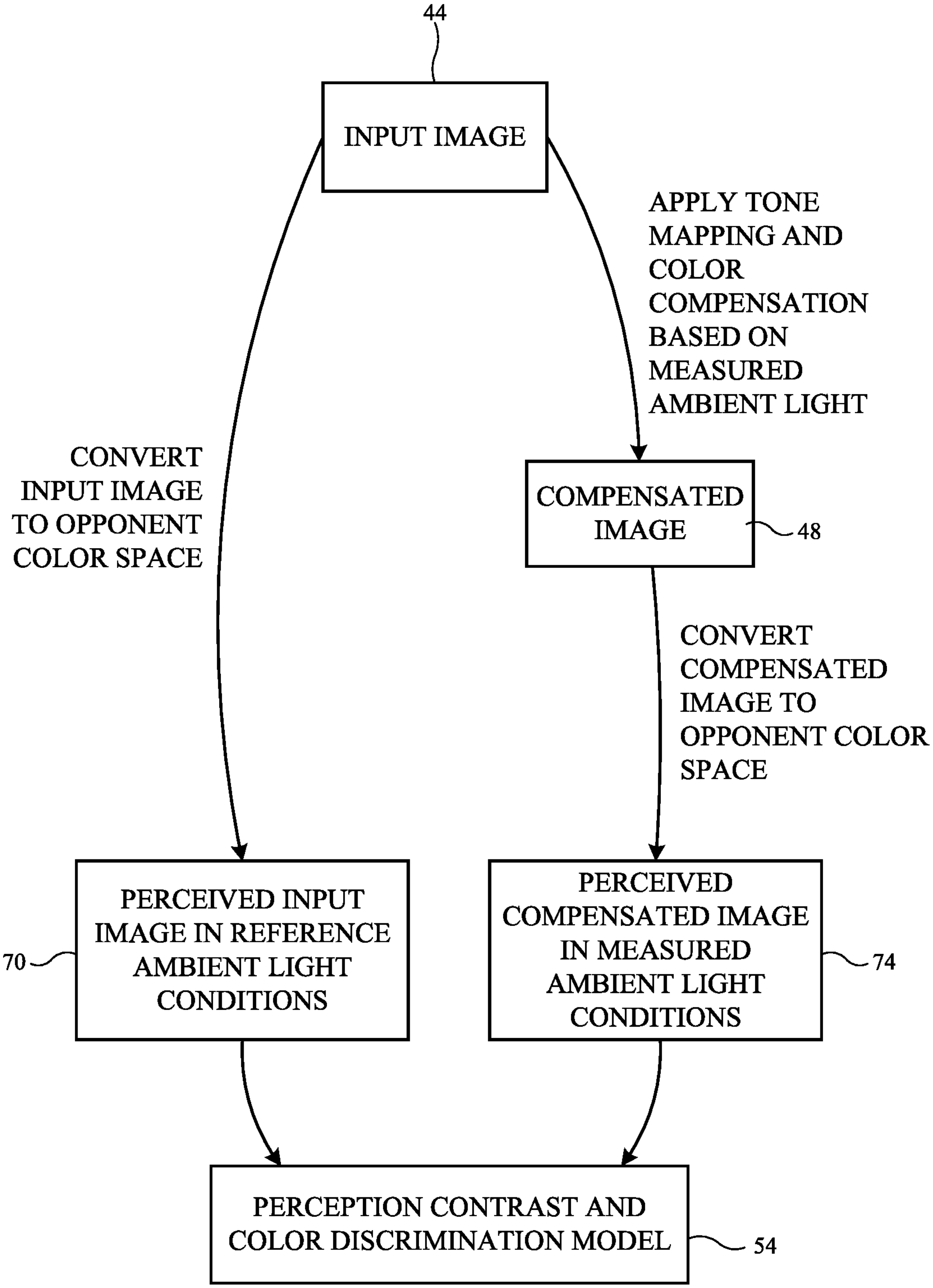
FIG. 10 is a diagram of an illustrative process for matching a perceived compensated image in low light conditions with a perceived original image in reference light conditions in accordance with an embodiment.

FIG. 10 is a diagram illustrating how control circuitry 16 in device 10 may use mesopic vision model 46 to compensate display images in low light conditions. As shown in FIG. 10, control circuitry 16 may receive an input image 44 to be displayed on display 14. Control circuitry 16 may use an iterative process for compensating image 44 that ensures that the output image that is displayed on display 14 in low ambient light conditions (e.g., 5 lux, 10 lux, 20 lux, 30 lux, more than 30 lux, less than 30 lux, etc.) is perceived as a close match to the original image in reference ambient light conditions (e.g., well-lit ambient viewing conditions such as 100 lux or other suitable ambient light brightness).

Since input image 44 may originally be represented in RGB color space (e.g., a color space defined by RGB digital display control values for red, green, and blue pixels in display 14), control circuitry 16 may first convert the original input image 44 to perceived image 70 in an opponent color space (e.g., having a luma channel representing brightness and two chroma channels representing the red-green channel and the blue-yellow channel of the human eye). An opponent color space defines light and color based on how the light and color are received in the retina. The goal for control circuitry 16 is to compare and closely match the retinal version of original image 44 in the reference ambient light condition to the retinal version of compensated image 48 in the measured ambient light condition. Since ambient lighting conditions will affect how an image is perceived by the retina, control circuitry 16 may use a reference ambient light brightness when mapping image 44 to perceived image 70 in the opponent color space under the reference ambient light conditions. Image 70 may, for example, have a luma component representing brightness, a first chroma component representing the red-green channel, and a second chroma component representing the blue-yellow channel.

Before, after, and/or in parallel with mapping image 44 to perceived reference image 70, control circuitry 16 may apply a tone mapping and color compensation to image 44 based on the measured ambient light conditions (e.g., based on the ambient light brightness measured by ambient light sensor 20) to produce compensated image 48. This may include, for example, applying a tone mapping curve to image 44 as described in connection with FIG. 6 and one or more color compensation mapping curves to image 44 as described in connection with FIGS. 7, 8, and 9.

After compensating image 44 to produce compensated image 48, control circuitry 16 may convert compensated image 48 to perceived compensated image 74 in the opponent color space. Since ambient lighting conditions will affect how an image is perceived by the retina, control circuitry 16 may use the measured ambient light brightness from ambient light sensor 20 when mapping compensated image 48 to perceived compensated image 74 in the opponent color space under the measured ambient light conditions. Image 74 may, for example, have a luma component representing brightness, a first chroma component representing the red-green channel, and a second chroma component representing the blue-yellow channel.

Control circuitry 16 may use perception contrast and color discrimination model 54 to compare the perceived input image 70 in the reference ambient light conditions to the perceived compensated image 74 in the measured ambient light conditions. This may include, for example, using perception contrast model 50 to determine an image contrast quality score based on the difference in contrast between perceived image 70 and perceived image 74 and using color discrimination model 52 to assign a color quality score based on the difference in colorfulness between perceived image 70 and perceived image 74. Lower scores may be associated with more closely matched images than higher scores (if desired). The two scores may be combined into a single image quality score to determine an overall quality of compensated image 48. If the image quality score is too high, control circuitry 16 may adjust the weights associated with the tone mapping (e.g., FIG. 6) and/or the color mapping (FIGS. 7, 8, and 9) until perceived image 70 and perceived image 74 are sufficiently close to one another. This iterative process is described in greater detail in the flow chart of FIG. 11.

Figure 11:
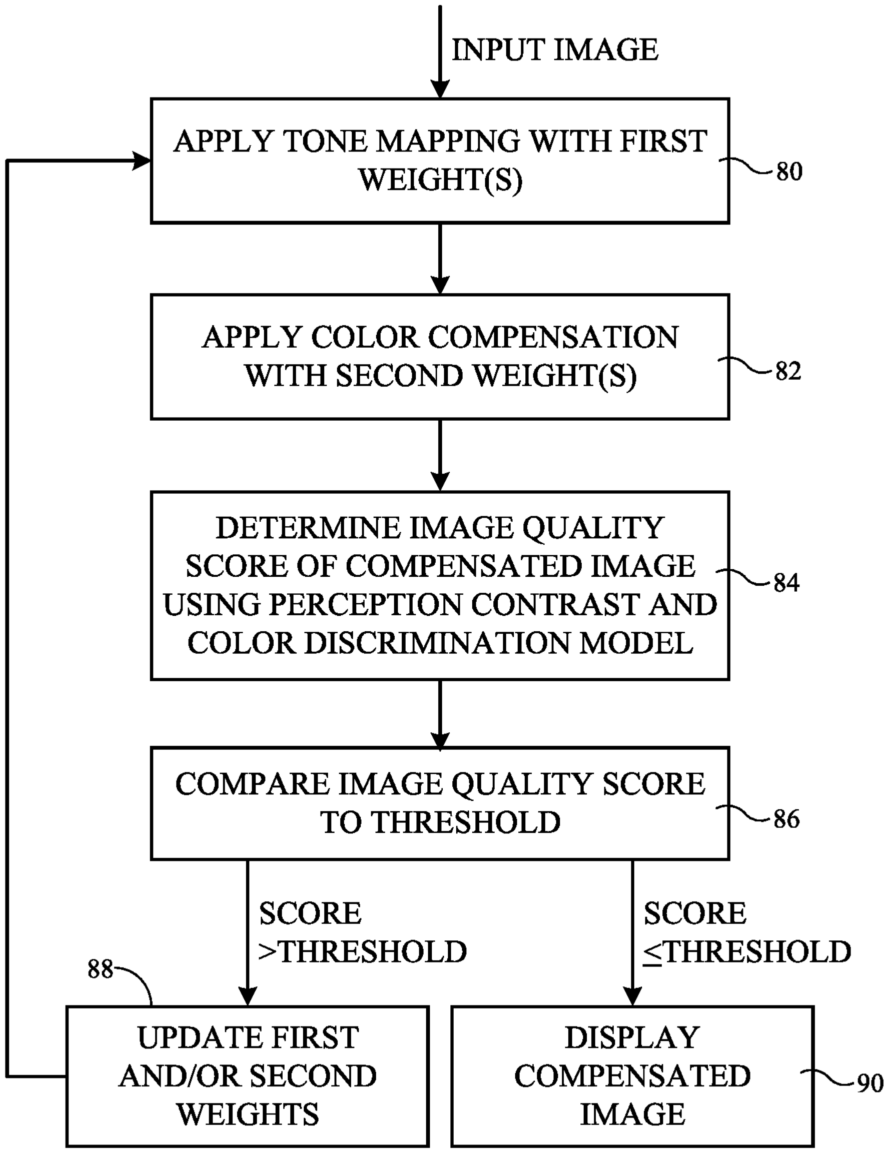
FIG. 11 is a flow chart of illustrative steps involved in displaying compensated images in low light using a mesopic vision model that implements a joint optimization process in accordance with an embodiment.

FIG. 11 is a flow chart of illustrative steps that may be used to display compensated images on display 14 in low light conditions (e.g., when the ambient light brightness measured by ambient light sensor 20 is less than a threshold).

During the operations of box 80, control circuitry 16 may receive input image 44 (sometimes referred to as original image 44) and may apply a tone mapping of mesopic vision model 46 to input image 44 with one or more first weights. The first weights may be an initial guess, may be based on the measured ambient light from sensor 20, and/or may be based on other factors. This may include, for example, applying one of the tone mapping curves of FIG. 6 to input image 44.

During the operations of box 82, control circuitry 16 may apply one or more color mapping functions of mesopic vision model 46 to input image 44 with one or more second weights. The second weights may be an initial guess, may be based on the measured ambient light from sensor 20, and/or may be based on other factors. This may include, for example, applying the brightness mapping curve of FIG. 7, the red-green channel mapping curve of FIG. 8, and the blue-yellow mapping curve of FIG. 9 to input image 44.

During the operations of block 84, control circuitry 16 may determine an image quality score of compensated image 48 (e.g., image 48 to which tone mapping and color mapping of mesopic vision model 46 have been applied) using perception contrast and color discrimination model 54. This may include, for example, converting compensated image 48 to an opponent color space and comparing the perceived compensated image 48 (e.g., the retinal version of the compensated image 48) in the measured ambient light conditions to the perceived original image 44 (e.g., the retinal version of the original image 44) in reference ambient light conditions, as described in connection with FIG. 10. Control circuitry 16 may determine a difference between the retinal version of the input image 44 in the reference ambient light brightness and the retinal version of the compensated image 48 in the measured ambient light brightness. This may include determining a difference in contrast as well as a difference in colorfulness between the two perceived images. For example, control circuitry 16 may use perception contrast model 50 to determine an image contrast quality score based on the difference in contrast between perceived original image 70 and perceived compensated image 74. Control circuitry 16 may use color discrimination model 52 to assign a color quality score based on the difference in colorfulness between perceived original image 70 and perceived compensated image 74. Lower scores may be associated with more closely matched images than higher scores (if desired). The two scores may be combined into a single image quality score to determine an overall quality of compensated image 48. A higher quality score indicates a greater difference between the two perceived images, whereas a lower quality score indicates a smaller difference between the two perceived images.

During the operations of block 86, control circuitry 16 may compare the image quality score determined during the operations of block 84 with a threshold image quality score (e.g., so that the overall difference between compensated image 48 in the measured low light conditions and original image 44 in reference light conditions is less than some JND value). If the image quality score is greater than the threshold, control circuitry 16 may adjust the first weights associated with the tone mapping (e.g., FIG. 6) and/or the second weights associated with the color mapping (FIGS. 7, 8, and 9) during the operations of block 88 and processing may loop back to block 80 until the image quality score is sufficiently low (e.g., to minimize the difference in contrast and colorfulness between the two perceived images 70 and 74). If the image quality score is less than or equal to the threshold, control circuitry 16 may provide compensated image 48 to display 14, and display 14 may display compensated image 48 during the operations of block 90.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
an ambient light sensor configured to measure an ambient light condition;
control circuitry configured to:
apply a tone mapping and color compensation to an input image to produce a compensated image; and
compare a perceived version of the input image in a reference ambient light condition to a perceived version of the compensated image in the measured ambient light condition; and
a display configured to display the compensated image when a difference between the perceived version of the compensated image in the measured ambient light condition and the perceived version of the input image in the reference ambient light condition is less than a threshold.

2. The electronic device defined in claim 1 wherein the control circuitry is configured to determine an image quality score based on the comparison between the perceived version of the input image in the reference ambient light condition and the perceived version of the compensated image in the measured ambient light condition.

3. The electronic device defined in claim 2 wherein the image quality score comprises a contrast quality score indicative of a difference in contrast between the perceived version of the input image in the reference ambient light condition and the perceived version of the compensated image in the measured ambient light condition.

4. The electronic device defined in claim 2 wherein the image quality score comprises a color quality score indicative of a difference in colorfulness between the perceived version of the input image in the reference ambient light condition and the perceived version of the compensated image in the measured ambient light condition.

5. The electronic device defined in claim 2 wherein the control circuitry is configured to adjust at least one of the tone mapping and the color compensation applied to the input image when the image quality score is greater than an additional threshold.

6. The electronic device defined in claim 5 wherein the display is configured to display the compensated image if the image quality score is less than the additional threshold.

7. The electronic device defined in claim 1 wherein the perceived version of the input image in the reference ambient light condition and the perceived version of the compensated image in the measured ambient light condition are represented in an opponent color space.

8. The electronic device defined in claim 7 wherein the opponent color space comprises a brightness component, a red-green component, and a blue-yellow component.

9. The electronic device defined in claim 8 wherein the color compensation comprises a first mapping function for mapping the brightness component, a second mapping function for mapping the red-green component, and a third mapping function for mapping the blue-yellow component.

10. The electronic device defined in claim 1 wherein the measured ambient light condition corresponds to a mesopic viewing condition and the reference ambient light condition corresponds to a photopic viewing condition.

11. An electronic device, comprising:
an ambient light sensor configured to measure an ambient light brightness;
a display configured to display a compensated image when the ambient light brightness is below a threshold; and
control circuitry configured to:
convert an input image for the display to the compensated image using a mesopic vision model that accounts for a reduced retinal color sensitivity in low light conditions,
assign a contrast quality score and a color quality score to the compensated image, and
adjust a compensation applied to the input image until the contrast quality score and the color quality score meet respective thresholds.

12. The electronic device defined in claim 11 wherein the mesopic vision model comprises a tone mapping process and a color compensation process that are jointly optimized.

13. The electronic device defined in claim 12 wherein the color compensation process comprises a brightness mapping function, a red-green mapping function, and a blue-yellow mapping function.

14. The electronic device defined in claim 11 wherein the control circuitry is configured to:
convert the input image to a perceived input image in an opponent color space based on a reference ambient light brightness;
convert the compensated image to a perceived compensated image in the opponent color space based on the measured ambient light brightness; and
compare the perceived input image to the perceived compensated image.

15. The electronic device defined in claim 14 wherein the display is configured to display the compensated image when a difference between the perceived input image and the perceived compensated image is less than a threshold.

16. An electronic device, comprising:
an ambient light sensor configured to measure an ambient light brightness;
control circuitry configured to:
compensate an input image when the measured ambient light brightness is below a threshold to produce a compensated image; and
compare a retinal version of the compensated image in the measured ambient light brightness with a retinal version of the input image in a reference ambient light brightness; and
a display configured to display the compensated image when a difference between the retinal version of the compensated image in the measured ambient light brightness and the retinal version of the input image in the reference ambient light brightness is less than a threshold.

17. The electronic device defined in claim 16 wherein the control circuitry is configured to compensate the input image using a tone mapping curve and at least one color mapping curve.

18. The electronic device defined in claim 17 wherein the at least one color mapping curve comprises a brightness mapping curve, a red-green channel mapping curve, and a blue-yellow mapping curve.

19. The electronic device defined in claim 17 wherein the control circuitry is configured to adjust the tone mapping curve and the at least one color mapping curve when the difference between the retinal version of the compensated input image in the measured ambient light brightness and the retinal version of the input image in the reference ambient light brightness is greater than a threshold.

20. The electronic device defined in claim 16 wherein the measured ambient light brightness corresponds to a mesopic viewing condition and the reference ambient light brightness corresponds to a photopic viewing condition.

* * * * *